(12) United States Patent
Repko et al.

(10) Patent No.: US 7,376,156 B2
(45) Date of Patent: May 20, 2008

(54) ALIGNMENT OF CLOCKS OVER MULTIPLE PACKET NETWORKS

(75) Inventors: Willem L. Repko, Hilversum (NL); Robertus Laurentius Van Der Valk, Capelle a/d IJssel (NL); Petrus W. Simons, Nieuwerkerk a/d IJssel (NL)

(73) Assignee: Zarlink Semiconductor Inc. (CA)

( * ) Notice: Subject to any disclaimer, the term of this patent is extended or adjusted under 35 U.S.C. 154(b) by 816 days.

(21) Appl. No.: 10/781,510

(22) Filed: Feb. 18, 2004

(65) Prior Publication Data

US 2004/0223518 A1    Nov. 11, 2004

Related U.S. Application Data

(60) Provisional application No. 60/448,740, filed on Feb. 20, 2003.

(51) Int. Cl.
*H04J 3/06* (2006.01)
(52) U.S. Cl. ........................... 370/503; 370/509
(58) Field of Classification Search ................ 370/395, 370/473, 503, 509
See application file for complete search history.

(56) References Cited

U.S. PATENT DOCUMENTS

| | | |
|---|---|---|
| 4,974,224 A | 11/1990 | Boone |
| 5,444,714 A | 8/1995 | Yun |
| 5,958,064 A | 9/1999 | Judd et al. |
| 6,081,844 A | 6/2000 | Nowatzyk et al. |
| 6,211,714 B1 | 4/2001 | Jeong |
| 2002/0141452 A1 | 10/2002 | Mauritz et al. |
| 2004/0062278 A1 * | 4/2004 | Hadzic et al. ............ 370/503 |

FOREIGN PATENT DOCUMENTS

| | | |
|---|---|---|
| EP | 0 986 202 A | 3/2000 |
| JP | 08008918 A | 1/1996 |
| JP | 10145366 A | 5/1998 |
| JP | 10276202 A | 10/1998 |
| JP | 11355280 A | 12/1999 |
| JP | 2002209229 A | 7/2002 |
| KR | 1000087 A | 1/2003 |

OTHER PUBLICATIONS

Kihara, Masami; "Performance Aspects of Reference Clock Distribution for Evolving Digital Networks"; IEEE Communications Magazine; Apr. 1989; pp. 24-34; No. 4, New York, NY, United States.

* cited by examiner

*Primary Examiner*—Seema S. Rao
*Assistant Examiner*—Wanda Z Russell
(74) *Attorney, Agent, or Firm*—Lawrence E. Laubscher, Jr.

(57) ABSTRACT

Disclosed is a method of aligning clocks over multiple networks having different clock domains. The method comprises transmitting timestamped packets over said networks between source and destination nodes, said timestamped packets conveying timing information based on a source clock at said source node, determining the expected delay over multiple nodes for a given traffic density, identifying at least one intermediate node between said source and destination node where said determined expected delay is such as to permit clock restoration within predefined acceptable parameters, restoring said source clock at said at least one intermediate restoration node to generate a restored intermediate clock signal, producing from said restored intermediate clock signal new timestamped packets conveying timing information based on said restored intermediate clock signal, and forwarding said new timestamped packets to said destination node.

5 Claims, 4 Drawing Sheets

ALIGNMENT OF CLOCKS OVER MULTIPLE PACKET NETWORKS

CROSS-REFERENCE TO RELATED APPLICATION

This application claims the benefit under 35 USC 119(e) of U.S. Provisional Application No. 60/448,740 filed Feb. 20, 2003, the contents of which are incorporated by reference herein.

FIELD OF THE INVENTION

The present invention relates to the field of digital communications. More specifically, the present invention relates to a method of aligning clocks over multiple packet networks.

BACKGROUND OF THE INVENTION

When time sensitive data, such as voice or video, is transported over asynchronous packet networks, such as Ethernet networks, some method must be employed to regenerate the local clock at the far end. Currently, several methods exist for transmitting clock signals over a packet network. Such methods include using a duplex connection and assuming that the delay over the packet network is more or less symmetrical, averaging the delay in a simplex connection, and using a detection mechanism in which each receiving node detects a shared event.

Not many methods are described that optimize the performance of such an approach over a large number of networks. If the number of networks grows, the number of potential problems increases dramatically. The likelihood of problems arising typically grows according to an exponential curve as the number of networks increases.

In a complex packet network environment it is not trivial to transport clock signals. Clocks are physical signals that exist in absolute time, and packet networks are designed to have as little time dependency as possible. The lack of real time performance in complex packet networks can reach such complex behavior that it becomes nearly impossible to perform acceptable clock recovery. The delay variation in a complex packet network, from input to output, typically becomes larger for each 'hop'.

Pending standard IEEE 1588 discloses a "divide and conquer" approach that uses 'boundary clocks'. These clocks are intended to cross the boundary between subdomains in such a way that the normal element that connects these sub-domains, routers, does not contribute to the delay. In the standard this is contrasted relative to the switches, where no such boundary clock is necessary.

According to the IEEE standard this is related to the fact that the switches have much smaller delay times than the routers. While that may have once been true, modern routers have a performance comparable with that of switches, and both introduce delays which in modern telecomm environments are considered to be quite large, albeit not as large as older routers. As such the suggested approach in the IEEE 1588 standard does not allow for the fact that a complex packet network, consisting only of multiple switches, can still introduce delay problems, nor does the standard describe what should be done at the boundary clock, except minimizing the delays by making the timepath shorter.

The problem of concatenated switches and routers is that the likelihood of timing traffic passing without severe delays becomes ever smaller. If in a simplified model the traffic density is assumed to be constant, the actual delay experienced by a packet traversing the networks is a function of the number of delay elements or hops. The actual delay is a concatenation of delays, such as the delay due to protocol stack handling (both on sending and receiving side), input queuing in the switch, output queuing in the switch, other administrative tasks (both in sending side, receiving side and switch), possibly contention and such. It is acceptable in the simple approach to assume constant average traffic density over all nodes, and later assess performance around bottlenecks in the system.

It is known to perform clock recovery in an intermediate node to extract physical signals for use in the physical domain at the intermediate node.

SUMMARY OF THE INVENTION

Disclosed is a novel method that can be optimized by forming nodes and networks into clusters, with a bridge function in between. The disclosed system provides clock restoration in a packet network, wherein time-stamped packets are transmitted between the source and destination. The packet network is not linked to physical signals. The system may use the physical level, but without any hard link between the packet and the clocks that are used to transport the data.

Thus, according to one aspect, the invention provides a method of aligning clocks over multiple networks having different clock domains. The method comprises transmitting timestamped packets over said networks between source and destination nodes, said timestamped packets conveying timing information based on a source clock at said source node, determining the expected delay over multiple nodes for a given traffic density, identifying at least one intermediate node between said source and destination node where said determined expected delay is such as to permit clock restoration within predefined acceptable parameters, restoring said source clock at said at least one intermediate restoration node to generate a restored intermediate clock signal, producing from said restored intermediate clock signal new timestamped packets conveying timing information based on said restored intermediate clock signal, and forwarding said new timestamped packets to said destination node.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

The invention can best be understood by considering the chance of no delay arising in a packet network as a function of the number of hops for a given traffic density. If the average traffic density is A*100%, and the number of hops is N, in a first order approach the chance of incurring a delay in a single hop is A, and the chance of not incurring a delay is (1−A). Therefore, the chance that N hops do not introduce a delay is then $(1-A)^N$.

Figure 1:
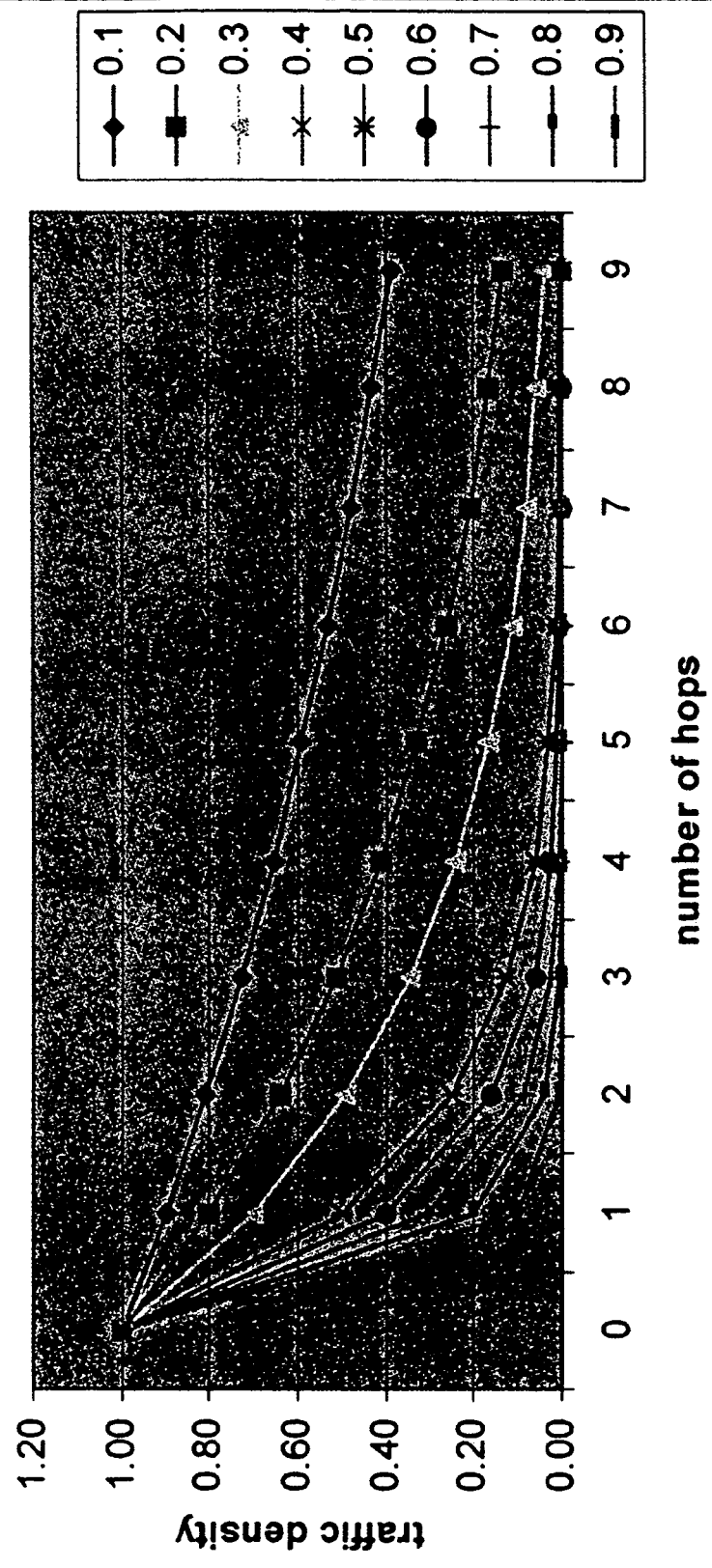
FIG. 1 is a graph showing the chance of no-delay as a function of the number of hops and traffic density.

FIG. 1 shows the chance of traffic incurring no delay for various traffic densities. It will be seen that the curves show acceptable results only for small numbers of hops or very low traffic densities. Traffic density could be kept low with fully dedicated networks, but that is of not of interest since the value of packet networks the possibility of cost reduction by permitting the use of one platform for all traffic.

Figure 2:
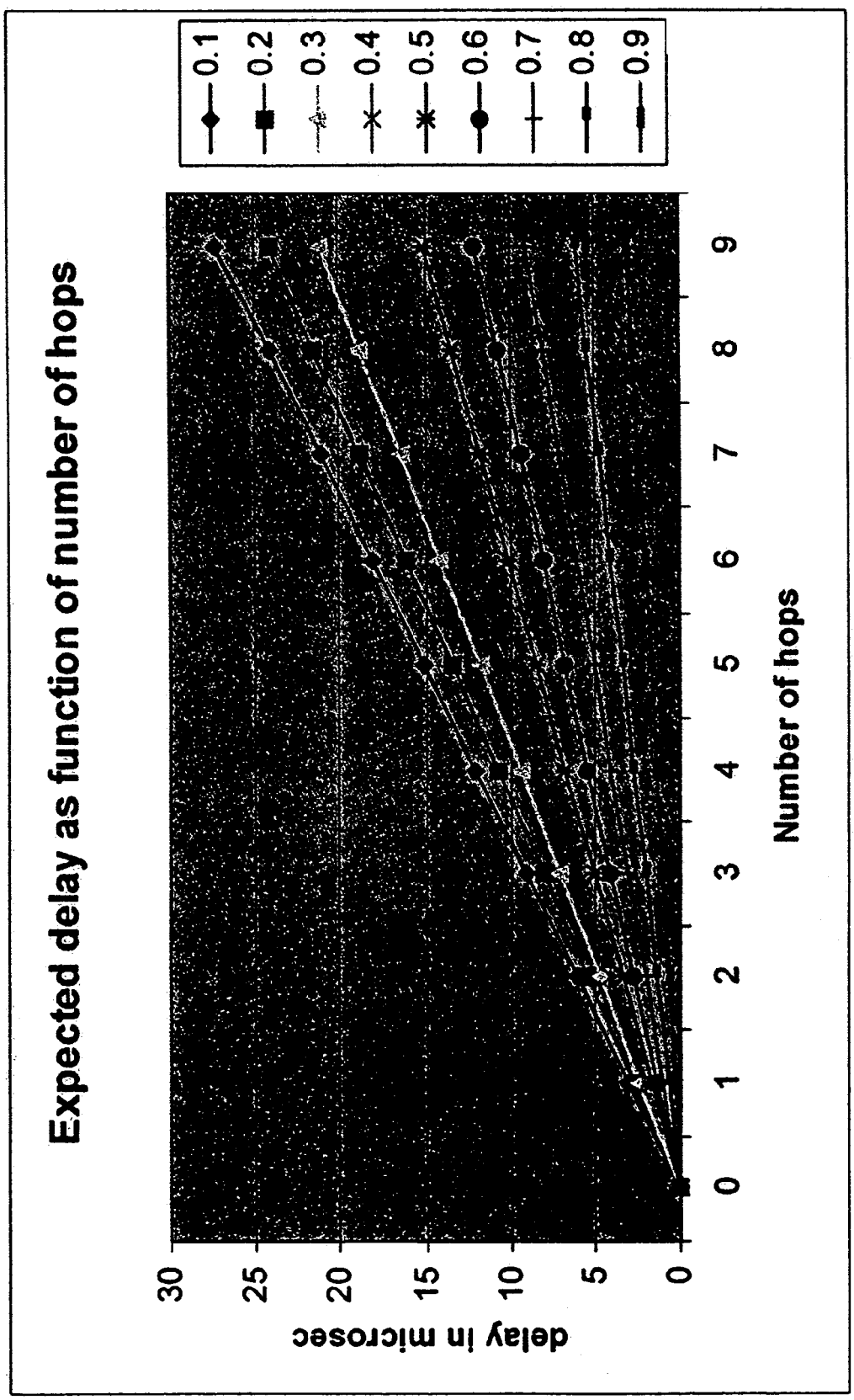
FIG. 2 is a graph showing the expected delay as a function of the number of hops.

The element that is missing on the graph is the actual size of the delay. If the delay were very small, the chance of delayed packets is not interesting since the accumulated delay will still be small. However, in reality is the delays are actually quite large. In the case, for example, of minimum sized packets in 100 Mbit/s Ethernet, which are 84 bytes long, the timelength of such a packet is 6.72 µs, and the average time length is half that value, namely 3.36 µs. Per node the average expected delay is then 3.36 µs* traffic density, and the accumulated average expected delay is N times that value. This yields the situation shown in FIG. 2.

In most applications it is not so much the actual average delay that is important, but rather what the average expected delay variation is. This will behave more as a square root function if the traffic on the network is pseudorandom because then the delays will add up randomly like noise signals. This would make the variation increase somewhat less than the increase of the average, but other factors make the variation much worse. The density is not constant over the network. In fact probably one or a few bottlenecks will be present that will dominate the delay variance. This effectively knocks out the square root behavior with the number of nodes. Thus the expected actual numbers are much worse. A larger network is normally not populated with minimum length packets only. The typical length that also occurs is about 20 times longer, and thus yields 20 times worse performance. The delay is in the range of 100's of microseconds.

If the clock is used for clocks such as defined in relevant standards, such as the Bellcore 1244 and Bellcore 253, a relevant target number would be around 20 ns worst case under all conditions. Thus the gap between what is typically to be expected in the delay, and what is desired, is in the order of a factor of at least 1000.

Normal averaging techniques give rise to problems because the ratio of problem vs. target, a factor 1000, yields a factor $1000^2$ as required measurement speed relative to the slowest response speed. The delays are more or less pseudorandom, and averaging is not extremely effective. Thus a huge factor has to be taken as effective speed reduction, which is not attractive or even feasible. The stability of clocks is necessarily required to be extremely high. Skipping samples by smart detection of 'bad cases' is also hampered because the number of 'not bad cases' dwindles down rapidly with the number of nodes.

In accordance with the principles of the invention, clock restoration is effected at chosen points, where the performance has not yet deteriorated beyond certain limits. From the graphs it will be apparent that making use of the chance that a packet is not severely delayed can pay off really fast.

For example, using not 9 nodes but 3 nodes between clock restoration points can yield a factor of 1000 improvement for traffic densities of 68%, whereas the average delay is only reduced with a factor 3. Making use of the (known) traffic densities pays off much faster than making use of the pseudorandom nature of the signals.

Figure 3:
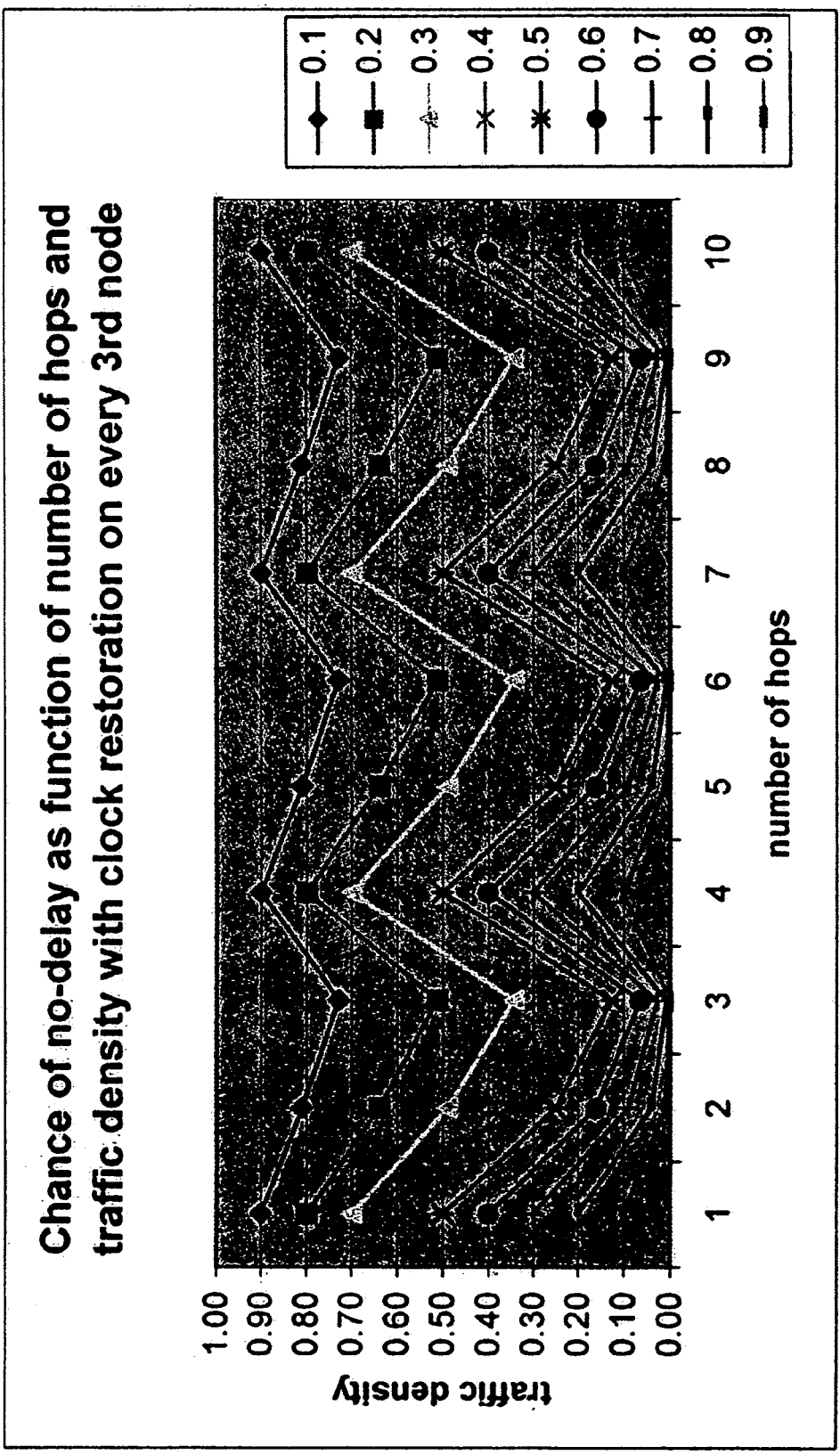
FIG. 3 is a graph showing the chance of no-delay as a function of the number of hops and traffic density with clock restoration on every $3^{rd}$ node.

Having a clock restoration point now serves two purposes. The clock restoration point can be used as a subdomain master, as was already described in the IEEE 1588. This drastically changes the graph shown in FIG. 1. For instance, if after every 3 nodes the clock is restored, the chance of delays on the next hop is 'reset' to the normal value of a single hop. In other words, the chain of probability is broken at the point of the clock restoration. This effect is shown in FIG. 3. The clock restoration point can and should be used to restore the clock.

The gain in the statistical properties will now be apparent. By suppressing at least part of the remaining clock inaccuracy the effective behavior is cleaned before problems have the opportunity to add up. The suppression can be optimized for the preceding trajectory of hops more easily in the case of short trajectories than longer trajectories where no actual restoration takes place. For instance, if clock restoration uses a low pass filter, the effective behavior is not very jumpy, but quite smooth. Using a smoothed clock for the next hops is much better especially if that next hop introduces its own jumpy behavior.

Each restoration should have HOLDOVER functionality as part of the restoration. In the HOLDOVER mode, the clock is put on the last well known frequency and maintained at this frequency in a free-running condition. This happens at moments where insufficient data is available to keep the clock on the right track. In smaller trajectories the time that HOLDOVER is used will be smaller than the HOLDOVER time used for longer trajectories. This will decrease the chance of severe problems significantly.

Consider the straightforward use of the IEEE1588 over four switches and one boundary clock, which probably should be modeled as another switch, so that the total acts like five switches. Suppose that each switch introduces an average of 5 µs delay, then the total average delay will be 25 µs. Suppose that each switch uses the restoration method, and that reduces delay for each hop by a factor 100. Then the first hop will lead to a 5 µs/100=50 ns error. The next hop will lead to (5 µs+50 ns)/100=50.5 ns, which is hardly worse than the performance after the first switch. Iterating in this manner, it will be seen that the penalty for a cascade can be given by a total degradation factor for an infinite number of hops. For instance, if restoration yields a factor 2 of improvement, the total behavior would be 1+1/2+1/4+1/8+ . . . =2. A factor 2 is not very good as target number per hop, but even then the performance for five hops is improved by a factor of 5/2=2.5.

In short: the proposal is to have restoration points of the clock, both in traffic sense as defined in the IEEE1588, but also by actual jitter suppression. The jitter suppression can be used to cancel out error effects before the error effects stack up (and then become inextricable). And if error effects become too large, use HOLDOVER in each restoration point (and be 'blind' to the errors), for then the total error is contained as soon and as limited in time as possible.

Figure 4:
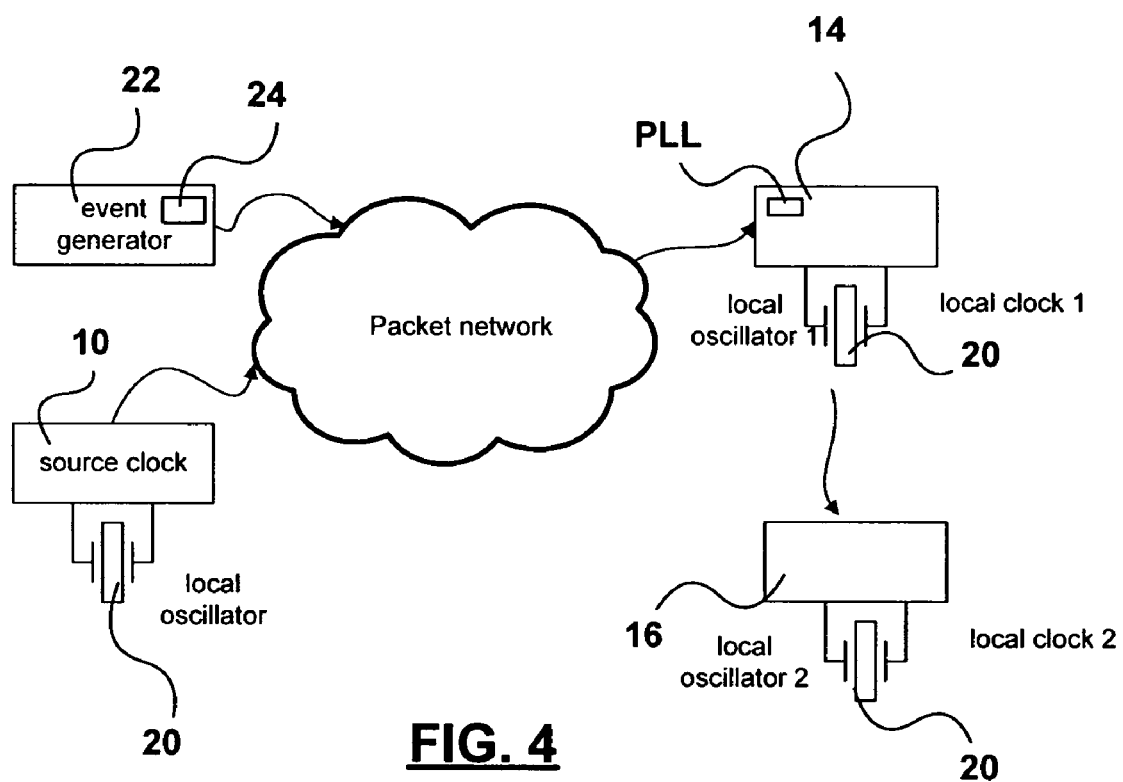
FIG. 4 is a schematic diagram of an embodiment of a system for aligning clocks over multiple networks having different clock domains in accordance with principles of the invention.

FIG. 4 illustrates one embodiment of a system for aligning clocks over multiple networks having different clock domains in accordance with principles of the present invention. At the sending node 10, the source clock has a local clock signal, typically generated by a crystal oscillator 20. An event generator 22 sends out packets from a source node to at least one receiving node. The event generator includes a time stamper 24. A packet is timestamped based on the source clock. The timestamped packet is transmitted over a network from a source node 10 toward a destination node 16 via at least one intermediate restoration node 14 across networks. The source clock is restored at the at least one intermediate node. The intermediate nodes chosen for restoration are based on the identification of where a determined expected delay is such as to permit clock restoration within predefined acceptable parameters. The source clock may be restored at restoration points by physical clock restoration using a phase locked loop. Using the oscillator of the intermediate node 20, an intermediate clock signal is generated. A new timestamped packet is produced from the intermediate clock signal. The new timestamped packet is then transmitted toward the destination node.

The implementation of clock restoration can be done in a number of ways, each with their own attractive and less attractive sides:

Actual physical restoration with a physical PLL

Numerical approach, so in fact something that calculates like a PLL (digital PLL), but actually runs as numbers only. In numerical systems it is quite trivial to build a low pass filter for instance, when the sample frequency is known.

A combination of both physical and numerical approach.

In a given network of hops this approach is very convenient:

Clock restoration from hop to hop can be done completely numerically, or, when a local physical clock is desired, by physical restoration. An effective low pass frequency is attractive on this place, to attenuate built-up jitter.

Physical restoration can be done at the nodes where a real physical signal is required, for there the signal must come out anyhow as a true signal.

It is convenient to choose the physical restoration low pass frequency somewhat lower then the hop-to-hop low pass frequency. Even if the clock has been restored a number of times, the last clock will have the lowest and therefore dominant low pass frequency. This will give a relative good definition of the output. Also the influence of the in between points will become near invisible, because they will be attenuated by the last restoration point.

A general sensible recipe is therefore to have numerical restoration with some low pass frequency, and final physical restoration with a somewhat lower low pass frequency. A typical factor between the low pass frequencies could be 5 or more.

All nodes should be able to switch to HOLDOVER, in numerical mode just as in physical mode. This gives the possibility to gracefully accept degraded conditions, by temporary disabling of the control mechanisms. In HOLDOVER mode, a clock will keep running at the last received reference frequency after removal of the reference frequency.

Numerous modifications may be made without departing from the spirit and scope of the invention as defined in the appended claims.

What is claimed is:

1. A method of aligning clocks over multiple networks having different clock domains, comprising:

transmitting timestamped packets over said networks between source and destination nodes via a plurality of intermediate nodes, said timestamped packets conveying timing information based on a source clock at said source node;

determining the expected delay per node for said timestamped packets to traverse multiple nodes for a given traffic density;

determining the chance of a timestamped packet not being delayed between said nodes;

identifying a plurality of intermediate nodes between said source and destination node where the expected delay between said intermediate nodes and the chance of a packet not being delayed is such as to permit clock restoration within predefined acceptable parameters;

restoring said clock at each said identified intermediate restoration node from the timestamped packets received at that node to generate a restored intermediate clock signal;

producing from said restored intermediate clock signal new timestamped packets conveying timing information based on said restored intermediate clock signal;

forwarding said new timestamped packets to said next intermediate node or said destination node when said new timestamped packets are produced from the last intermediate node.

2. A method as claimed in claim 1, wherein said source clock is restored at said restoration points by physical clock restoration using a phase locked loop.

3. A method as claimed in claim 1, wherein said source clock is restored at said restoration points by numerical techniques.

4. A method as claimed in claim 1, wherein said source clock is restored at said restoration points by a combination of a physical restoration and a numerical technique.

5. A method as claimed in claim 1, wherein each restoration has a HOLDOVER functionality as part of the restoration.

* * * * *